United States Patent [19]
Teagle

[11] 3,843,206
[45] Oct. 22, 1974

[54] BRAKING SYSTEMS FOR VEHICLES

[76] Inventor: William Thomas Teagle, Blackwater, Truro, Cornwall, England

[22] Filed: Mar. 1, 1972

[21] Appl. No.: 230,908

[30] Foreign Application Priority Data
Mar. 1, 1971    Great Britain .................. 5648/71
Dec. 1, 1971    Great Britain .................. 55754/71

[52] U.S. Cl. ............ 303/7, 137/115, 137/625.69, 180/82 R, 188/170, 298/17 S, 298/22 R, 303/9
[51] Int. Cl. ............................................ B60t 13/22
[58] Field of Search ............ 303/7, 53, 18, 9, 2, 79, 303/76, 6, 13, 5, 1, 50, 56; 188/170, 3 R, 106 P, 352; 214/140, 762, 138 R; 298/175, 22 R; 180/82 R, 100; 91/413; 137/115, 625.69

[56] References Cited
UNITED STATES PATENTS

| | | | |
|---|---|---|---|
| 1,449,642 | 3/1923 | Warenskjold et al. ............ | 137/530 |
| 1,457,544 | 6/1923 | Myers ................................ | 137/530 |
| 2,484,628 | 10/1949 | Valley .............................. | 303/50 |
| 3,216,769 | 11/1965 | Hicks et al. ...................... | 188/264 E |
| 3,217,732 | 11/1965 | Hangeland ........................ | 137/115 |
| 3,519,312 | 7/1970 | Cruse ................................ | 303/50 |
| 3,669,513 | 6/1972 | Smith ................................ | 188/170 |
| 3,695,731 | 10/1972 | England et al. .................. | 303/7 |

FOREIGN PATENTS OR APPLICATIONS

| | | | |
|---|---|---|---|
| 946,208 | 7/1956 | Germany ........................ | 303/6 R |

*Primary Examiner*—Duane A. Reger
*Assistant Examiner*—D. C. Butler
*Attorney, Agent, or Firm*—Norris & Bateman

[57] ABSTRACT

A fail safe tractor-trailer braking system has brake applying springs operating on the trailer brakes through piston and cylinder devices to which hydraulic fluid under pressure is supplied from the tractor against the opposition of the springs to release the brakes under the control of a springloaded valve which is manually operable to vary the loading of the spring and so vary the braking pressure. When applied to tipping trailers a further valve is provided to selectively connect the brakes and the tipping mechanism to the pressure fluid source and thus ensure that hydraulic fluid is bled from the braking system and the brakes are fully applied before tipping can commence.

8 Claims, 8 Drawing Figures

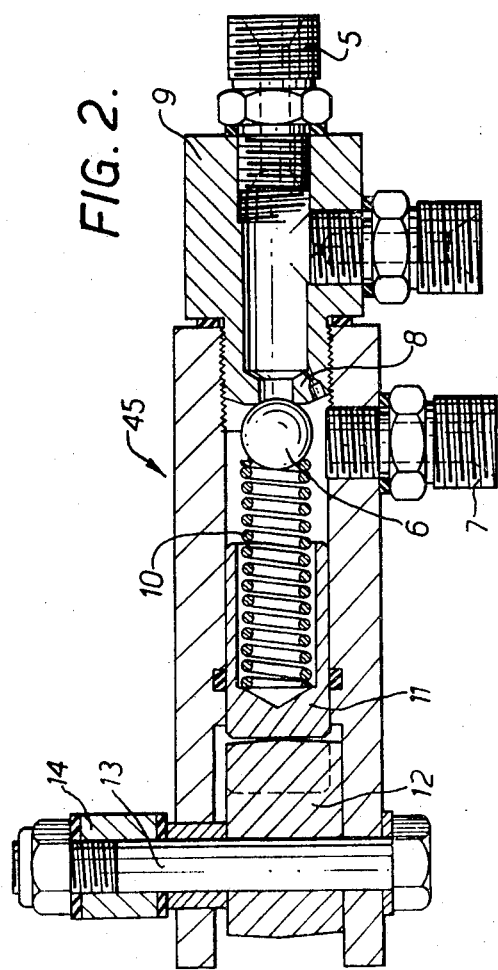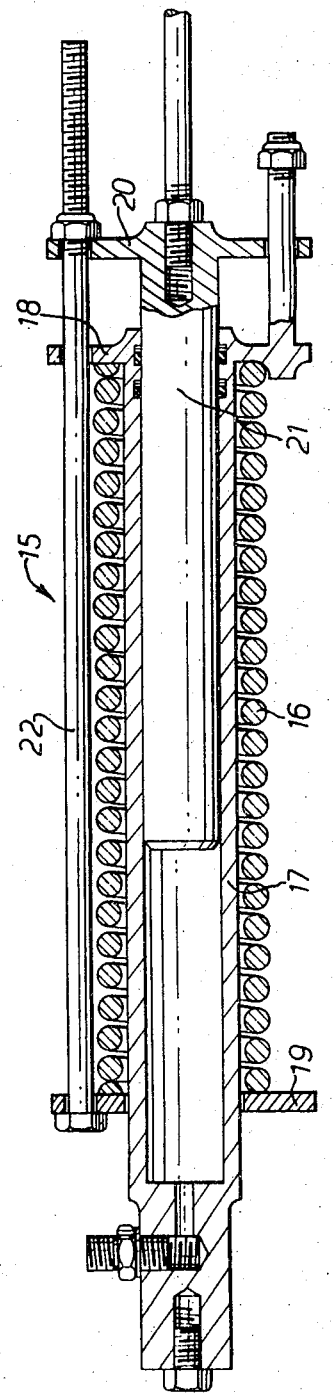

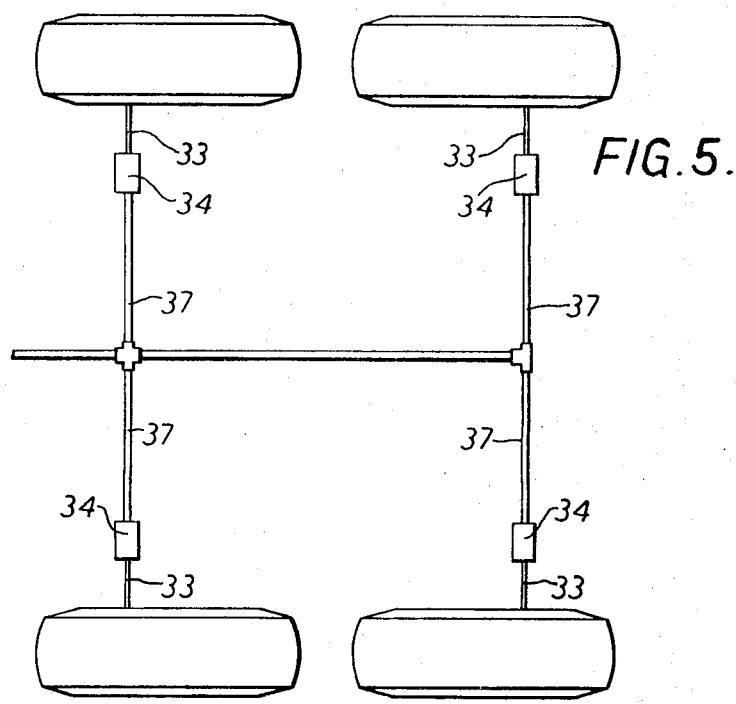
FIG.5.
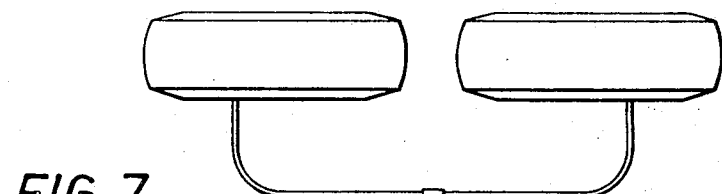
FIG.7.
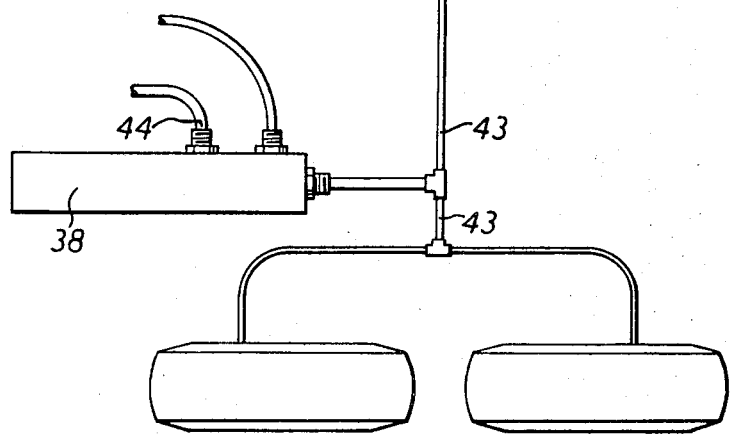

BRAKING SYSTEMS FOR VEHICLES

This invention relates to braking systems for agricultural and other tractor-drawn trailer vehicles and its object is to provide a fail-safe system, the braking force of which can be varied at will.

To this end, according to one feature of the invention, each wheel brake of the trailer vehicle is applied by spring pressure in opposition to the pressure of hydraulic fluid supplied from the tractor through a common pressure control valve which is manually operable to vary said fluid pressure between a maximum at which the brakes are fully released and a minimum at which the brakes are fully applied.

When the trailer is provided with tipping mechanism an manually operable valve is preferably provided for alternately connecting the hydraulic pressure line from the tractor vehicle to the braking system and the tipping mechanism to ensure that tipping can only take place when the trailer brakes are fully applied.

Various embodiments of the invention will be described with reference to the accompanying drawings in which:

FIG. 2 is an enlarged sectional view of the brake pressure control valve shown in FIG. 1;

FIGS. 3 and 4 are enlarged sectional views of modified forms of brake cylinders for use in the system shown in FIG. 1;

FIG. 5 is a diagrammatic representation of part of a modified form of braking system;

FIG. 7 is a diagrammatic view of part of a further modified form of braking system.

Figure 1:
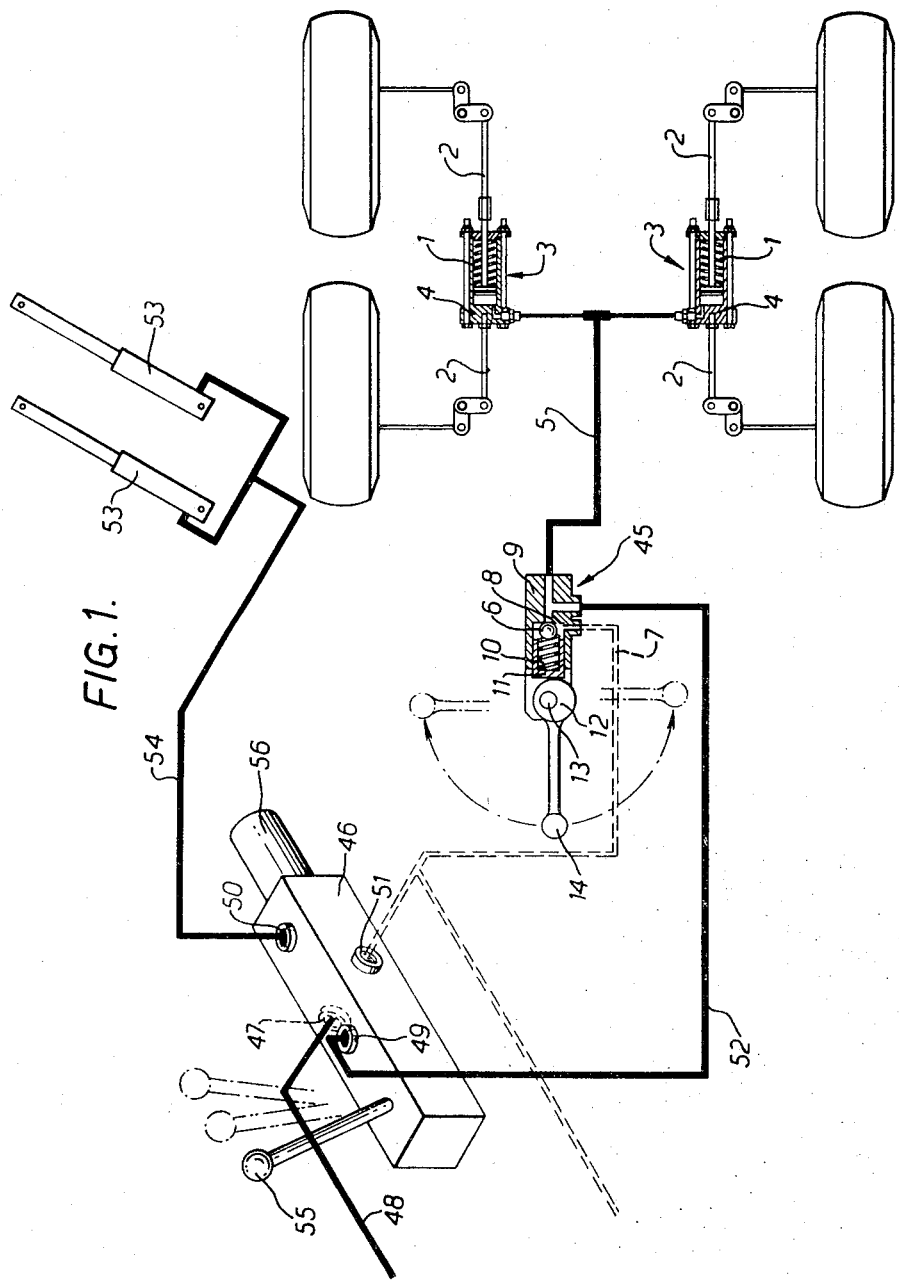
FIG. 1 is a mainly diagrammatic representation of a combined braking system and tipping mechanism for a tractor-drawn tipping trailer.

Referring to FIG. 1 the wheel brakes on a tipping trailer vehicle are applied by compression springs 1 which exert brake-applying pressure on brake rods 2 through two piston and cylinder devices 3. The cylinder 4 of each piston and cylinder device 3 is connected to a common hydraulic pressure line 5 through which fluid is pumped from the tractor vehicle at a pressure determined by a control valve 45 having a spring-loaded ball valve member 6 which controls a connection between the pressure line 5 and a return line 7 to the tractor vehicle while permitting constant communication between said lines through a small bleed passage 8 in the valve casing 9. The valve spring 10 is held in compression between the valve member 6 and a cup-like retainer 11 which is slidably mounted in the valve casing 9 for movement towards and away from the valve member by a cam 12 in permanent engagement with the retainer 11 and eccentrically arranged on the shaft 13 of a manually operable lever 14 which is movable through 180 degrees to vary the loading of the valve spring 10 between a maximum at which the pressure of fluid supplied to each piston and cylinder device 3 is sufficient to hold the brakes off and a minimum in which the pressure of fluid applied to each piston and cylinder device 3 is insufficient to prevent each spring 1 from fully applying the brakes.

In the piston and cylinder device 15 shown in FIG. 3, the spring 16 surrounds the cylinder 17 and acts at one end upon a flange 18 on one end of the cylinder 17 and at the other end upon a collar 19 which is connected to a flange 20 on one end of the piston 21 by a rod 22.

Figure 4:
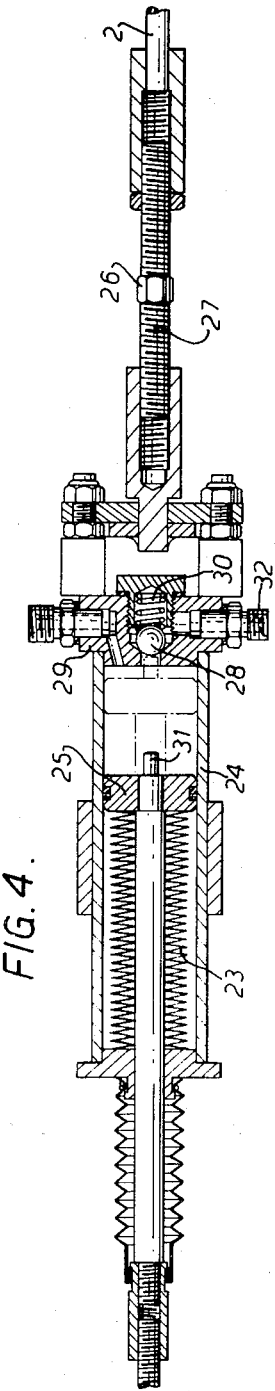

In the piston and cylinder device shown in FIG. 4 the spring is replaced by belleville washers 23 acting between one end of the cylinder 24 and the piston 25. The brakes may be adjusted by means on a nut 26 on a threaded portion 27 of the brake rod 2 and to retain the brakes in the applied position when adjustment is required a valve member 28 in the end wall 29 of the cylinder 24 is adapted to be unseated against the action of a spring 30 by a pin 31 on the end of the piston 25 to allow fluid to drain from the cylinder 24 through a connection 32.

Figure 6:
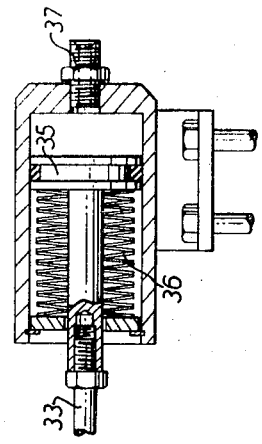
FIG. 6 is an enlarged sectional view of one of the brake cylinders shown in FIG. 5.

In the system shown in FIGS. 5 and 6 the trailer vehicle brakes are actuated by rods 33 secured to separate piston and cylinder devices 34, the piston 35 of each of which is acted upon in the brake-applying direction by an assembly of belleville washers 36 and acted upon in the opposite direction by pressure fluid supplied thereto via the control valve 45 and one of the individual brake pipes 37.

Figure 8:
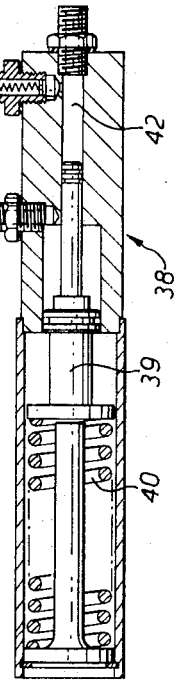
FIG. 8 is a sectional view of the master cylinder shown in FIG. 7.

In the system shown in FIGS. 7 and 8 the brakes on the trailer vehicle are actuated hydraulically by a master cylinder 38 having a stepped piston 39 which is acted upon in the brake-applying direction by a compression spring 40 to pressurise hydraulic fluid supplied through a non-return valve 41 to a chamber 42 connected to the brake pipes 43 leading to the individual wheel brake cylinders (not shown) and acted upon in the opposite direction by pressure fluid supplied via the control valve and the connection 44 to reduce the pressure of the fluid in the brake pipes 43.

In all the above cases it will be evident that if the supply of hydraulic fluid from the tractor vehicle is interrupted, due for instance to failure of the pump, rupture of the oil line or uncoupling of the trailer vehicle, the fluid pressure in the or each piston and cylinder device will be insufficient to prevent the or each associated brake spring from applying the trailer vehicle brakes, while the presence of the bleed passage 8 in the control valve 45 ensures almost immediate application of the trailer vehicle brakes should the tractor vehicle engine stop. Since the pressure required to hold the trailer vehicle brakes off is considerably less than that normally required by the tractor vehicle hydraulic system, relatively little power is needed.

When the invention is applied to tractor-drawn tipping trailers means shown in FIG. 1 is preferably provided to ensure that tipping can only take place when the trailer brakes are fully applied and to enable the trailer to be moved by the tractor vehicle with the tipping mechanism in any one of a number of positions of adjustment. Such means comprises a multi-position spool valve 46 having an inlet 47 connected to the hydraulic pressure line 48 from the tractor vehicle and three outlets 49, 50 and 51, the first of which is connected to the piston and cylinder devices 3 via lines 52 and 5 and the spring-loaded control valve 45, the second of which is connected by a line 54 to the rams 53 of the hydraulic tipping gear and the third of which is connected to the return oil line 7 from the control valve 45. The valve 46 has three positions of adjustment between which it is moved by a manually operable lever 55 co-operating with detents or the like (not shown) to hold the valve member 56 in its adjusted positions. In the first of these positions each piston and cylinder device 3 of the trailer brake-operating mechanism is connected to the hydraulic pressure line 48 from the tractor vehicle to hold the brakes off and the tipping rams 53 are connected to the oil return line 7 rendering the tipping gear inoperative. In the second position each piston and cylinder device 3 of the trailer brake-operating mechanism is connected to the return line 7 to allow each spring 1 to apply the brakes and the tipping rams 53 are connected to the tractor hydraulic pressure line 48 to operate the tipping gear. In its thrid position of operation the valve 46 traps the fluid in the connection to the tipping rams 53 to hold the tipping gear in the position to which is has been raised and at the same time connects each piston and cylinder device 3 of the brake-operating mechanism to the hydraulic pressure line 48 from the tractor to hold the brakes off and permit the trailer to be moved with its load in a raised position.

The braking system of the invention is easy to operate since the braking power is controlled by the spring-loaded valve 45 and not by the physical strength of the operator.

A parked loaded trailer is safe from accidental release of the brakes since the brakes can only be released when tbe trailer is properly coupled to a tractor with its engine running.

The invention, which has wide application, may be employed on combine harvesters and may other tractor-towed agricultural machines.

I claim:

1. A braking system for a tractor-drawn tipping trailer vehicle provided with hydraulically operated tipping gear, comprising spring means for applying each trailer wheel brake, means on the tractor vehicle for supplying hydraulic fluid under pressure through a hydraulic pressure line to release said wheel brakes against the action of said spring means, a control valve which is manually operable to vary the pressure at which said hydraulic fluid is supplied to said wheel brakes between a maximum at which the brakes are fully released and a minimum at which the brakes are fully applied, and a multi-position valve located in the hydraulic pressure line upstream of said control valve and manually operable to selectively direct fluid to said brakes and to said tipping gear.

2. A braking system according to claim 1, wherein said multi-position valve is operable to trap pressure fluid in the connection to said tipping gear while at the same time directing fluid to release said brakes.

3. A braking system for a tractor-drawn trailer vehicle, comprising spring means for applying each trailer wheel brake, means on the tractor vehicle for supplying fluid under pressure through an hydraulic pressure line to release said wheel brake against the action of said spring means and a control valve which is manually operable to vary the pressure at which hydraulic fluid is supplied to said wheel brakes between a maximum at which the brakes are fully released and a minimum at which the brakes are fully applied, said control valve comprising a valve casing, a spring-loaded ball valve in said casing having manually operable means to variably control a connection between said pressure line and a return line to fluid pressure supply on the tractor vehicle and means providing a small open bleed passage in said valve casing which maintains a constant connection between said pressure and return lines for ensuring substantially immediate application of the trailer wheel brakes in the event of failure of pressure derived from said pressure supply means in said tractor vehicle.

4. A braking system according to claim 3, wherein said brakes are mechanically operated and said spring means exerts brake-applying pressure on the actuating rods of said brakes through at least one piston and cylinder device the cylinder of which is connected to said pressure line.

5. A braking system accordwng to claim 4, wherein said spring means comprises at least one compression spring.

6. A braking system according to claim 4, wherein said spring means comprises an assembly of belleville washers.

7. A braking system according to claim 3, wherein the loading spring for said valve member is held in compression between said valve member and a cup-like retainer slidably mounted in the valve casing in permanent engagement with a cam eccentrically mounted on the shaft of a lever manually rotatable through 180° to vary the loading of said spring.

8. A braking system according to claim 3, wherein said brakes are hydraulically operated and said spring means comprises a compression spring which exerts pressure on brake fluid in brake pipes leading to the individual brakes through the piston of a piston and cylinder device.

* * * * *